United States Patent Office 3,267,096
Patented August 16, 1966

3,267,096
DERIVATIVES OF 2H,4H-BENZOTHIADIAZINE 1,1-DIOXIDE
Shin Hayao, Elkhart, Ind., assignor to Miles Laboratories, Inc., Elkhart, Ind., a corporation of Indiana
No Drawing. Filed Feb. 24, 1965, Ser. No. 435,023
9 Claims. (Cl. 260—243)

This invention relates to a series of 2-aminoalkyl-3-oxo-1,2,4-(2H,4H)-benzothiadiazine 1,1-dioxides having useful pharmacological properties. More particularly this invention relates to a series of such compounds wherein the nitrogen in the 2-position is substituted with an aminoalkyl moiety.

The compounds of this invention can be represented generically by means of the structural formula:

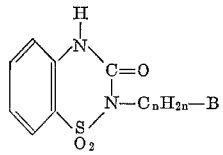

wherein n is an integrer from 3 to 5 and B is a member selected from the group consisting of

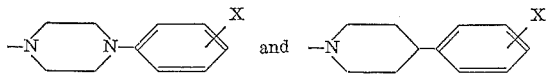

wherein X is a member selected from the group consisting of hydrogen, fluoro, chloro and trifluoromethyl.

These compounds can be conveniently prepared starting from the known compound o-nitrobenzenesulfonyl chloride by reacting this compound with an ω-aminoalkyl heterocyclic compound. This reaction can be carried out in a suitable solvent such as benzene. It requires a basic catalyst. Any suitable base can be used. However, an aqueous base, such as sodium hydroxide or potassium hydroxide, is preferred. The resulting o-nitrobenzenesulfonamide can be readily converted to the corresponding o-aminobenzenesulfonide by means of any convenient reduction reaction, chemical or catalytic. Catalytic reduction with hydrogen using a platinum or palladium catalyst and acetic acid as solvent is preferred. The o-aminobenezenesulfonamide obtained by means of the reduction step is then caused to cyclize to the desired benzothiadiazine by means of an appropriate carbonyl cyclizing agent such as phosgene. This reaction is preferably carried out in chlorobenzene as solvent. The various steps involved in the synthetic scheme by which the compounds of this invention can be prepared are illustrated in the reaction sequence given below:

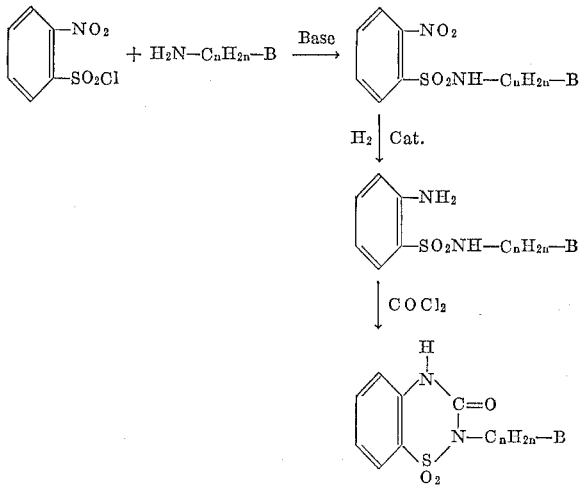

wherein n and B are as defined above.

The compounds of this invention display useful pharmacological activity. They are effective as central nervous system depressants, anti-inflammatory agents and anti-hypertensive agents.

The invention will be better understood by reference to the following examples which are included for the purpose of illustration and are not to be construed as in any way limiting the scope of the invention which is defined in the claims appended hereto.

EXAMPLE 1

2-[3-(4-phenyl-1-piperazyl)propyl]-1,2,4(2H,4H)-benzothiadiazin-3-one-1,1-dioxide (A) N-[3-(4-PHENYL-1-PIPERAZYL)PROPYL]-2-NITROBENZENESULFONAMIDE To an ice-cold solution of 1-(3-aminopropyl)-4-phenylpiperazine (43.8 g., 0.2 mole) in 100 ml. of benzene and 100 ml. of 20 percent sodium hydroxide solution was added a solution of o-nitrobenzenesulfonyl chloride (44.3 g., 0.2 mole) in 100 ml. of benzene with vigorous stirring to give a light brown cloudy solution which was stirred an additional hour. The solution was made acidic with dilute hydrochloric acid to give a gummy mixture which was made basic with concentrated ammonium hydroxide to give a light yellow solid. It was collected on a filter, washed with water and with ether and dried in an oven at 50°, yield 79.2 g. (98.0 percent), M.P. ca. 175° (softening at 134°). It was recrystallized from aqueous methanol-DMF to give a bright yellow solid of M.P. 138°–139°, yield 24.9 g.

$v_{max.}^{CHCl_3}$: 1530 and 1360 cm.$^{-1}$ ($NO_2$) and 1335 and 1170 cm.$^{-1}$ ($SO_2\overset{|}{N}$—)

Anal.—Calcd. for $C_{19}H_{24}N_4O_4S$: N, 13.9. Found: N, 13.8.

(B) 2-AMINO-N-[3-(4-PHENYL-1-PIPERAZYL)PROPYL] BENZENESULFONAMIDE

The above nitro compound (23.9 g., 0.059 mole) in 200 ml. of glacial acetic acid was hydrogenated at room temperature with 5 g. of freshly prepared palladium on charcoal catalyst (5 percent by weight) under 50 lb. of hydrogen. It took up a calculated amount of hydrogen during overnight shaking. The catalyst was removed and the light yellow filtrate was evaporated in vacuo to leave an amber colored syrup. It was cooled in an ice-water bath and made basic with concentrated ammonium hydroxide to give a light gray oil which failed to solidify on standing. It was extracted with chloroform and with ether and the combined extracts were dried over anhydrous magnesium sulfate. It was added to 200 ml. of 2-propanol saturated with dry hydrogen chloride to give a colorless solid which was collected by suction, washed with ethyl acetate-ether and then stirred in ethyl acetate to remove excess hydrogen chloride. It was collected and dried in vacuo in a desiccator, yield 24.9 g., M.P. 225°–227° (dec.). It was recrystallized from aqueous methanolic hydrogen chloride to give a colorless solid of M.P. 226°–228° (dec.), yield 21.8 g.

Anal.—Calcd. for $C_{19}H_{28}Cl_2N_4O_2S$: HCl, 16.3. Found: HCl, 16.2.

A sample was converted to the free base with aqueous ammonia and recrystallized from aqueous methanol to give a colorless solid of M.P. 117°–118°.

$a_{max.}^{CHCl_3}$: 3470, 3370 cm.$^{-1}$ ($NH_2$ and NH), 1330 and 1210 cm.$^{-1}$ ($-SO_2\overset{|}{N}-$)

Anal.—Calcd. for $C_{19}H_{26}N_4O_2S$: N, 15.0 Found: N, 14.8.

(C) 2 - [3 - (4-PHENYL - 1 - PIPERAZYL)PROPYL]-1,2,4-(2H,4H)-BENZOTHIADIAZIN-3-ONE 1,1-DIOXIDE HYDROCHLORIDE MONOMETHANOLATE

To a boiling solution of 2-amino-N-[3-(4-phenyl-1-piperazyl)propyl]benzenesulfonamide (31.3 g., 0.084 mole) in 250 ml. of chlorobenzene was bubbled in a slow stream of phosgene during 60 minutes to give a light tan gum which soon became a solid by the end of reaction. It was cooled and the solid was collected on a filter, washed with ethyl acetate-ether and dried in air, yield 38.2 g., M.P. 226°–232° (dec.) with softening began at 200°. It was triturated with aqueous ammonia to give a light tan solid which was collected by suction, washed with water and dried at 50° in an oven, yield 35.2 g., M.P. 141°–148°. It was recrystallized from aqueous acetone (charcoal) to give a light tan solid of M.P. 151°–154°, yield 25.3 g. A sample was again recrystallized to give the pure product of M.P. 152°–153°.

$\nu^{CHCl_3}$: 3420 cm.$^{-1}$ (N—H), 1695 cm.$^{-1}$ (imide C=O), 1350 and 1210 cm.$^{-1}$ (—SO$_2$N—)

*Anal.*—Calcd. for $C_{20}H_{24}N_4O_3S$: C, 60.0; H, 6.00; N, 14.0. Found: C, 59.9; H, 6.45; N, 14.0.

It was dissolved in hot methanol and saturated with dry hydrogen chloride to give a light tan crystalline solid of M.P. 256°–257° (dec.), yield 26.6 g.

*Anal.*—Calcd. for $C_{20}H_{24}N_4O_3S \cdot CHl \cdot CH_3OH$: C, 53.98; H, 6.55; N, 11.67; HCl, 7.88; N (basic), 2.98. Found: C, 53.80; H, 6.20; N, 11.95; HCl, 7.80; N (basic), 2.99.

EXAMPLE 2

2-[3(4-m-chlorophenyl-1-piperazyl)propyl]-1, 2, 4 (2H,4H)-benzothiadiazin-3-one, 1,1-dioxide (A) 2-AMINO-N-[3-(4-m-CHLOROPHENYL-1-PIPERAZYL)PROPYL]BENZENESULFONAMIDE To a solution of 2-nitro-N-[3-(4-m-chlorophenyl-1-piperazyl)propyl]benzenesulfonamide (76.1 g., 0.174 mole) in 210 ml. of glacial acetic acid was added 10 g. (5 percent by weight) of pre-reduced palladium on charcoal catalyst and hydrogenated at room temperature under 50 lb. of hydrogen to take up calculated amount of hydrogen in 6 hours. The catalyst was filtered off and the solution was evaporated to dryness in vacuo to leave a dark amber liquid which was treated with aqueous ammonia to give a tan sticky solid. It was extracted with chloroform and the extract was dried. To the brown filtrate was added 250 ml. of 2-propanol saturated with dry hydrogen chloride (74.2 g., 2.03 mole) to give a yellowish tan solid which was collected on a filter, washed with ethyl acetate-ether and dried in air, yield 88.8 g., M.P. 110°–150°. It was recrystallized from methanolic hydrogen chloride-ethyl acetate to give a light orange-yellow solid of M.P. 155°–156° (dec.), yield 75.8 g.

*Anal.*—Calcd. for $C_{19}H_{25}ClN_4O_2S \cdot 3HCl \cdot CH_3OH$: HCl, 19.9. Found: HCl, 19.6.

The hydrochloride was suspended in water and treated with aqueous ammonia to give an orange-yellow gum which was extracted with chloroform. The extract was dried and the solvent was stripped off in vacuo to give a syrup which soon solidified. It was recrystallized from aqueous acetone (charcoal) to give a colorless solid of M.P. 105°–107°, yield 54.8 g.

$\nu^{CHCl_3}_{max}$: 3455, 3360 cm.$^{-1}$ (NH$_2$ and NH), 1325 cm.$^{-1}$ (—SO$_2$N—) 1150 and 1140 cm.$^{-1}$ (—SO$_2$N—)

*Anal.*—Calcd. for $C_{19}H_{25}ClN_4O_2S$: N, 13.7. Found: N, 13.3.

(B) 2-[3-(4-m-CHLOROPHENYL-1-PIPERAZYL)PROPYL]-1,2,4(2H,4H)-BENZOTHIADIAZIN-3-ONE 1,1-DIOXIDE HYDROCHLORIDE

Into a boiling solution of the above sulfonamide (54.3 g., 0.124 mole) in 250 ml. of chlorobenzene was bubbled a slow stream of phosgene during a 60-minute period with vigorous stirring to give at first a tan oil which solidified at the end. The reaction mixture was cooled in an ice-water bath and the light tan solid was collected on a filter, washed with ethyl acetate-ether and dried in air, yield 65.1 g., M.P. 222°–226°. It was recrystallized from aqueous methanol-DMF (charcoal) to give a slightly tan solid of M.P. 224°–226°, yield 47.4 g.

$\nu^{KCL}_{max}$: 1690 cm.$^{-1}$ (imide C=O), 1325 and 1175 cm.$^{-1}$ (—SO$_2$N—)

*Anal.*—Calcd. for $C_{20}H_{24}Cl_2N_4O_3S$: N, 11.9; HCl, 7.75. Found: N, 11.8; 12.0; HCl, 7.75.

The filtrate from the recrystallization was concentrated by heating on a hot plate to give a solid on cooling. It was treated with aqueous ammonia to give a yellow gummy solid which soon solidified. It was collected by suction, washed with water and recrystallized from aqueous methanol (charcoal) to give a light tan solid of M.P. 147°–149°, yield 10.0 g. It was again recrystallized to give a light tan solid of M.P. 149°–150°, yield 9.5 g.

$\nu^{CHCl_3}_{max}$: 3400 cm.$^{-1}$ (free N—H), 3200, 3130 cm.$^{-1}$ (assoc. N—H), 1680 cm.$^{-1}$ (imide C=O), 1340, 1175 and 1155 cm.$^{-1}$ (—SO$_2$N—)

*Anal.*—Calcd. for $C_{20}H_{23}ClN_4O_3S$: C, 55.4; H, 5.30; N, 12.9. Found: C, 54.8; H, 5.85; N, 12.8.

EXAMPLE 3

2 - [4 - (4 - m - chlorophenyl - 1 - piperazyl)butyl] 1,2,4(2H, 4H) - benzothiadiazin - 3 - one 1,1 - dioxide (A) 2-NITRO-N-[4-(4-m-CHLOROPHENYL-1-PIPERAZYL)BUTYL]-BENZENESULFONAMIDE To an ice-cold mixture of 1-m-chlorophenyl-4-(4-aminobutyl)piperazine (44.0 g., 0.164 mole) in 100 ml. of benzene and 100 ml. of 20 percent sodium hydroxide solution was added a solution of 2-nitrobenzenesulfonyl chloride (49.3 g., 0.223 mole) in 100 ml. of benzene during 30 minutes to give a cream yellow milky solution. It was stirred at this temperature for an additional 60 minutes and dilute hydrochloric acid was added until the mixture was acidic to give a yellow sticky gum. It was then made basic with aqueous ammonia to give a clear benzene solution. It was separated, dried and the solvent stripped off in vacuo to leave a bright yellow solid mass.

(B) 2-AMINO-N-[4-(4-m-CHLOROPHENYL-1-PIPERAZYL)BUTYL]BENZENESULFONAMIDE

The above nitro compound was dissolved in 200 ml. of glacial acetic acid and then reduced with 10 g. (5 percent by weight) of pre-reduced palladium on charcoal catalyst under 50 lb. of hydrogen at room temperature to absorb a calculated amount of hydrogen in 17 hours (overnight). The catalyst was removed and the solution was evaporated to dryness in vacuo to give an amber syrup which failed to solidify. It was treated with aqueous ammonia to give a yellowish-brown semi-solid which was extracted with chloroform and with ethyl acetate. The combined extracts were dried and then added to 200 ml. of 2-propanol saturated with dry hydrogen chloride (52.2 g., 1.43 mole) to give a dark green gum which slowly solidified on addition of more ethyl acetate and 2-propanol. The crude solid was collected and recrystallized from methanolic hydrogen chloride to give a slightly grayish powder of M.P. 136°–139° (dec.), yield 67.6 g. The free base was obtained by treating the hydrochloride with aqueous ammonia.

(C) 2-[4-(4-m-CHLOROPHENYL-1-PIPERAZYL)BUTYL]-1,2,4(2H,4H)-BENZOTHIADIAZIN-3-ONE 1,1-DIOXIDE MALEATE

To a boiling solution of the above crude amine (51.4 g., 0.122 mole) in 250 ml. of chlorobenzene was bubbled in a slow stream of phosgene during a 50-minute period to give a tan gummy solid which crystallized at the end. The mixture was cooled in an ice-water bath and ethyl acetate was added. The light tan solid was collected by suction, washed with ethyl acetate-ether and then recrystallized from aqueous methanol-ethyl acetate-ether mixture to give a small amount of product. The solution was concentrated by heating on a hot plate, treated with charcoal, filtered and treated with dry hydrogen chloride to give a tan solid. It was collected by suction, washed with ethyl acetate-ether and dried in air, yield 49.0 g., M.P. 208°–217° (dec.). It was again recrystallized to give a light tan solid of M.P. 210°–216° (dec.), yield 44.9 g. It was suspended in water and made basic with aqueous ammonia to give a light tan solid which was collected by suction, washed with water and dried in air, yield 39.0 g., M.P. 126°–131°. It was recrystallized thrice to give a light tan solid of M.P. 133°–134°, yield 29.1 g.

*Anal.*—Calcd. for $C_{21}H_{25}ClN_4O_3S$: C, 56.2; H, 5.58. Found: C, 55.7; H, 6.48.

It was dissolved in methanol and maleic acid (7.6 g., 0.065 mole) was added to give a clear solution which was boiled down with ethyl acetate, filtered while hot and diluted with ether to give a slightly tan powder of M.P. 161°–163° (dec.), yield 33.1 g.

*Anal.*—Calcd. for $C_{21}H_{25}ClN_4O_3S \cdot C_4H_4O_4$: C, 53.2; H, 5.14; N, 9.93. Found: C, 53.5; H, 5.19; N, 9.87.

EXAMPLE 4

2 - [3 - (4-m-trifluoromethylphenyl-1-piperazyl)propyl]-1,2,4(2H, 4H)-benzothiadiazin-3-one 1,1-dioxide hydrochloride Into a boiling solution of 2-amino-N-[3-(4-m-trifluoromethylphenyl - 1 - piperazyl)propyl]benzene sulfonamide (76.0 g., 0.171 mole) in 250 ml. of chlorobenzene was bubbled a slow stream of phosgene during 100 minutes to give a dark brown oil that separated from the hot solution. It was cooled in an ice-water bath and the oil solidified. The solid was washed with ethyl acetate and treated with a mixture of aqueous sodium hydroxide and chloroform. The organic layer was separated and dried over anhydrous magnesium sulfate. The solvent was removed in vacuo and the residue was dissolved in ether. Maleic acid (20.8 g., 0.18 mole) was added to the ethereal solution to give a tan gum which solidified on scratching, yield 91.7 g., M.P. 173°–183° (dec.). It was converted to the free base (a dark oil) which gradually solidified on scratching, yield 63.2 g., M.P. 138°–150°. It was thrice recrystallized from aqueous methanol (charcoal) to give a tan solid of M.P. 141°–153°, yield 45 g. The crude free base (44.1 g., 0.095 mole) was suspended in methanol and maleic acid (11.6 g., 0.1 mole) was added to give a dark solution from which a solid soon separated. More methanol was added to dissolve the solid. The dark solution was concentrated and ether was added to give a light tan solid of M.P. 187°–189° (dec.), yield 38.4 g. It was recrystallized from methanol-ether to give a tan powder of M.P. 184°–185° (dec.), yield 28.3 g.

*Anal.*—Calcd. for $C_{21}H_{23}F_3N_4O_3S \cdot C_4H_4O_4$: N, 9.60. Found: N, 9.31.

The maleate was converted to the hydrochloride by reaction with hydrochloric acid, M.P. 262°–263° (dec.), yield 10.7 g.

*Anal.*—Calcd. for $C_{21}H_{23}F_3N_4O_3S \cdot HCl$: C, 50.0; H, 4.76; N, 11.1; HCl, 7.24. Found: C, 50.0; H, 4.74; N, 10.8; HCl, 7.20.

EXAMPLE 5

2-[3-(4-phenyl-1-piperidyl)propyl]-1,2,4(2H, 4H)-benzothiadiazin-3-one 1,1-dioxide (A) 2-NITRO-N-[3-(4-PHENYL-1-PIPERIDYL)PROPYL] BENZENESULFONAMIDE To an ice-cold solution of 1-(3-aminopropyl)-4-phenylpiperidine (40.1 g., 0.184 mole) in 100 ml. of benzene and 100 ml. of 20 percent sodium hydroxide solution was added dropwise at solution of o-nitrobenzenesulfonyl chloride (40.5 g., 0.184 mole) during a 60-minute period to give a yellow milky solution. It was stirred at this temperature for 60 minutes and made acidic with dilute hydrochloric acid and then made basic with aqueous ammonia. A small amount of solid came out and collected on a filter, yield 7.9 g., M.P. 112°–113°. The organic layer was separated and the aqueous layer was extracted with ether. The combined extracts were dried and filtered. A mixture of inorganic salt and the product was stirred in water and the product was collected, yield 10.1 g., M.P. 112°–114°. The yellow filtrate was concentrated and diluted with n-hexane to give a light yellow solid of M.P. 102°–107°, yield 41.4 g. Thus, the total yield was 59.4 g. (80 percent). The first crop was recrystallized from aqueous methanol to give a colorless solid of M.P. 113°–114°.

*Anal.*—Calcd. for $C_{21}H_{25}N_3O_4S$: N, 10.41. Found: N, 10.54.

(B) 2-[3 - (4 - PHENYL - 1 - PIPERIDYL)PROPYL]-1,2,4-(2H,4H) BENZOTHIADIAZIN-3-ONE 1,1-DIOXIDE HYDROCHLORIDE METHANOLATE

The above nitro compound (51.5 g., 0.128 mole) was hydrogenated in 150 ml. of glacial acetic acid with 5 g. (5 percent by weight) of pre-reduced palladium on charcoal catalyst. It took up 27 lbs. of hydrogen (calculated 33.5 lbs.) in 4 hours. Another 5 g. of pre-reduced catalyst was added and the mixture was further reduced. It took up an additional 6.5 lbs. of hydrogen in 20 hours. Thus, the total up-take was 33.5 lbs. The catalyst was removed and the filtrate was concentrated in vacuo to leave a viscous syrup which was dissolved in water and made basic with aqueous ammonia to give a tan syrup which did not solidify. It was extracted with chlorobenzene and the organic layer was dried. The chlorobenzene solution was heated under reflux while a slow stream of phosgene was bubbled in over a 50-minute period. The reaction mixture was cooled in an ice-water bath and the oil solidified to a hard glass. The solvent was decanted off and the glass was washed with ethyl acetate-ether. The glass became a tan solid of M.P. 175°–178° (dec.), yield 48.8 g. It was recrystallized twice from aqueous methanol-ether (charcoal) to give a light tan solid of M.P. 219°–220° (dec.), yield 20.8 g.

$v_{max.}^{KCl}$: 1720 cm.$^{-1}$ (amide C=O) 1325 and 1180 cm.$^{-1}$ (—SO$_2$N—)

*Anal.*—Calcd. for $C_{21}H_{25}N_3O_3S \cdot HCl \cdot CH_3OH$: C, 56.5; H, 6.41; N, 8.98; HCl, 7.80. Found: C, 56.8; H, 6.49; N, 9.20; HCl, 7.98.

The filtrates from recrystallizations were combined and concentrated. The residue was treated with aqueous ammonia to give a light tan solid, yield 153°–158°. It was recrystallized twice from aqueous acetone to give a light tan solid of M.P. 161°–162°, yield 16.0 g.

*Anal.*—Calcd. for $C_{21}H_{25}N_3O_3S$: C, 63.1; H, 6.26; N, 10.5. Found: C, 63.0; H, 6.21; N, 10.6.

EXAMPLE 6

2 - [5 - (4 - Phenyl - 1 - piperazyl)pentyl] - 1,2,4(2H,4H)-benzothiadiazin-3-one-1,1-dioxide (A) 2-NITRO-N-[5-(4-PHENYL-1-PIPERAZYL)PENTYL]-BENZENESULFONAMIDE To an ice-cold mixture of 1-(5-aminopentyl)-4-phenylpiperazine (56.5 g., 0.228 mole) in 100 ml. of benzene and 100 ml. of 20 percent aqueous sodium hydroxide was added a solution of 2-nitrobenzenesulfonyl chloride (50.5 g., 0.228 mole) in 100 ml. of benzene during 15 minutes to give an orange yellow milky solution which was stirred at this temperature for another 60 minutes. It was made acidic with dilute hydrochloric acid to give a light yellow solid which was then treated with aqueous ammonia to give a free sulfonamide. It was collected by suction, washed with water and ether and then recrystallized from aqueous methanol-DMF to give a bright yellow solid of M.P. 128°–130°, yield 75.7 g. (77.0 percent). A sample was again recrystallized from acetone-n-hexane to give a pale yellow solid of M.P. 127°–128°.

$\nu_{max}^{KJ}$: 1545 and 1355 cm.$^{-1}$ (NO$_2$), 1340 and 1170 cm.$^{-1}$ (—SO$_2$N—)

Anal.—Calcd. for $C_{21}H_{28}N_4O_4S$: N, 12.94. Found: N, 12.61.

(B) 2-AMINO-N-[5-(4-PHENYL-1-PIPERAZYL)PENTYL]-BENZENESULFONAMIDE

A solution of the above nitro compound (74.3 g., 0.172 mole) in 200 ml. of glacial acetic acid was hydrogenated at room temperature with 10 g. of pre-reduced palladium on charcoal (5 percent by weight) under 50 lb. of hydrogen during 24 hours. The catalyst was removed and the filtrate was evaporated to dryness in vacuo to give an amber liquid which was made basic with aqueous ammonia to give a yellowish tan syrup which partially solidified. It was heated in n-hexane to give a light yellow solid, yield 54.2 g. A sample was recrystallized from acetone-chloroform-n-hexane to give a crystalline solid of M.P. 152°–153°.

$\nu_{max}^{KCl}$: 2950 and 2860 cm.$^{-1}$ (NH and NH$_2$), 1340 and 1325 cm.$^{-1}$ (doublets —SO$_2$N—), 1160 and 1150 cm.$^{-1}$ (doublets —SO$_2$N—)

Anal.—Calcd. for $C_{21}H_{30}N_4O_2S$: N, 13.95. Found: N, 13.61.

(C) 2 - [5-(4 - PHENYL - 1 - PIPERAZYL)PENTYL - 1,2,4-(2H,4H)BENZOTHIADIAZIN-3-ONE 1,1-DIOXIDE DIHYDROCHLORIDE

Into a boiling solution of the above amine (52.9 g., 0.132 mole) in 250 ml. of chlorobenzene was bubbled a slow stream of phosgene during 60 minutes to give a solid which came out from the hot mixture. The reaction mixture was cooled in an ice-water bath and the solid was collected by suction, washed with ethyl acetate and dried in air, yield 67.4 g., M.P. 190°–200° (dec.). It was recrystallized several times from methanol containing hydrogen chloride to give 22.2 g. of a light tan solid of M.P. 190° (dec.), softening at 175°.

$\nu_{max}^{KCl}$: 1720 (imide C=O), 1330 and 1180 cm.$^{-1}$ (—SO$_2$N—)

Anal.—Calcd. for $C_{22}H_{28}N_4O_3S \cdot 2HCl$: C, 52.7; H, 5.99; N, 14.6; HCl, 11.2. Found: C, 52.4; H, 6.91; N, 14.5; HCl, 11.0.

EXAMPLE 7

2 - [3 - (4 - p - fluorophenyl - 1 - piperazyl)propyl] - 1,2,4(2H,4H)benzothiadiazine-3-one-1,1-dioxide (A) 2-NITRO-N-[3(4-p-FLUOROPHENYL-1-PIPERAZYL)-PROPYL]BENZENESULFONAMIDE To an ice cold solution of 1-(3-aminopropyl)-4-p-fluorophenylpiperazine (35.6 g., 0.15 mole) in 100 ml. of benzene and 100 ml. of 20 percent sodium hydroxide was added a solution of o-nitrobenzenesulfonyl chloride (31.7 g., 0.15 mole) in 100 ml. of benzene during 30 minutes with vigorous stirring. The resulting opaque solution was stirred at this temperature for 2 hours. Dilute hydrochloric acid (18 percent) was added to the mixture to give a yellowish brown syrup. Then aqueous ammonia was added to liberate the free base (a light yellow solid). It was collected by suction, washed with water and dried in an oven at 50° overnight, yield 48.2 g. (87.5 percent), M.P. 127°–130°. It was recrystallized from acetone (with a little methanol) and n-hexane to give a light yellow solid of M.P. 130°–132°, yield 40.3 g. A sample was again recrystallized to give a bright yellow solid of M.P. 132°–133°.

$\nu_{max}^{CHCl_3}$: 1545 (NO$_2$), 1350 and 1170 cm.$^{-1}$ (—SO$_2$N—)

(B) 2-AMINO-N-[3-(4-p-FLUOROPHENYL-1-PIPERAZYL)-PROPYL]BENZENESULFONAMIDE

A solution of the above nitro compound (39.0 g., 0.106 mole) in 200 ml. of glacial acetic acid was hydrogenated at room temperature with 11 g. of pre-reduced palladium on charcoal catalyst (5 percent by weight) under 50 lb. of hydrogen. It took up a calculated amount of hydrogen in 30 minutes. Then the catalyst was removed and the filtrate was concentrated in vacuo to leave an amber syrup. It was dissolved in water and made basic with aqueous ammonia to give a light tan gum which solidified in a few hours. The solid was collected on a filter, washed with water and dried in air, yield 34.2 g., M.P. 117°–121°. A sample was recrystallized from aqueous methanol to give a colorless solid of M.P. 121°–122°.

$\nu_{max}^{CHCl_3}$: 3450 and 3460 (NH$_2$, NH), 1630 (NH$_2$), 1325 and 1315 (doublets—SO$_2$N—), 1145 cm.$^{-1}$ (—SO$_2$N—)

Anal.—Calcd. for $C_{19}H_{25}FN_4O_2S$: N, 14.29. Found: N, 14.03.

(C) 2 - [3 - (4-p-FLUOROPHENYL - 1 - PIPERAZYL)PROPYL]-1,2,4(2H,4H)BENZOTHIADIAZIN-3-ONE 1,1-DIOXIDE HYDROCHLORIDE

To ice-cold chlorobenzene containing phosgene (40.0 g., 0.405 mole) was added the above amine (32.8 g., 0.084 mole) all at once to give a white precipitate which was stirred at room temperature overnight. It was refluxed for 3 hours to give a light tan solid. It was collected by suction, washed with ethyl acetate and dried in air, yield 40.3 g., M.P. 214°–220° (dec.). It was recrystallized from aqueous methanol-ethyl acetate to give a colorless solid of M.P. 228°–230°, yield 30.2 g.

$\nu_{max}^{KCl}$: 1700 (imide C=O), 1335 and 1180 cm.$^{-1}$ (—SO$_2$N—)

Anal.—Calcd. for $C_{20}H_{23}FN_4O_3S$: C, 52.9; H, 5.29; N, 12.4; HCl, 8.05. Found: C, 52.5, 52.8; H, 5.46, 534; N, 12.5; HCl, 8.01.

The 2-aminoalkyl-3-oxo-1,2,4(2H,4H)-benzothiadiazine 1,1-dioxides prepared in the foregoing examples are shown in Table 1.

TABLE 1

| Example No. | Chemical Name and Structure | Formula |
|---|---|---|
| 1 | 2-[3-(4-Phenyl-1-piperazyl)propyl]-1,2,4(2H,4H)-benzothiadiazin-3-one 1,1-dioxide. | $C_{20}H_{24}N_4O_3S$ |
| 2 | 2-[3-(4-m-Chlorophenyl-1-piperazyl)propyl]-1,2,4(2H,4H)-benzothiadiazin-3-one 1,1-dioxide. | $C_{20}H_{23}ClN_4O_3S$ |
| 3 | 2-[4-(4-m-Chlorophenyl-1-piperazyl)butyl]-1,2,4(2H,4H)-benzothiadiazin-3-one 1,1-dioxide. | $C_{21}H_{25}ClN_4O_3S$ |
| 4 | 2-[3-(4-m-Trifluoromethylphenyl-1-piperazyl)propyl]-1,2,4(2H,4H)-benzothiadiazin-3-one 1,1-dioxide. | $C_{21}H_{23}F_3N_4O_3S$ |
| 5 | 2-[3-(4-Phenyl-1-piperidy)propyl]-1,2,4(2H,4H-benzothiadiazin-3-one 1,1-dioxide. | $C_{21}H_{25}N_3O_3S$ |
| 6 | 2-[5-(4-Phenyl-1-piperazyl)pentyl]-1,2,4(2H,4H)-benzothiadiazin-3-one 1,1-dioxide. | $C_{22}H_{28}N_4O_3S$ |
| 7 | 2-[3-(4-p-Fluorophenyl-1-piperazyl)propyl]-1,2,4(2H,4H)-benzothiadiazin-3-one 1,1-dioxide. | $C_{20}H_{23}FN_4O_3S$ |

The foregoing examples are intended to be illustrative of the types of compounds which can be prepared in accordance with this invention. Other compounds falling within the scope of the appended claims will be apparent

What is claimed is:

1. A compound selected from the group consisting of compounds of the formula

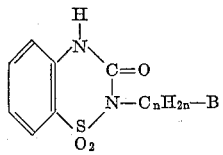

wherein $n$ is an integer from 3 to 5 and B is a member selected from the group consisting of

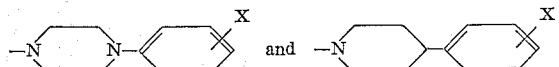

wherein X is a member selected from the group consisting of hydrogen, fluoro, chloro and trifluoromethyl, and pharmacologically acceptable salts thereof.

2. 2 - [3 - (4 - phenyl - 1 - piperazyl)propyl] - 1,2,4(2H, 4H)-benzothiadiazin-3-one 1,1-dioxide.

3. 2 - [3 - (4 - m - chlorophenyl - 1 - piperazyl)propyl]-1,2,4(2H, 4H)-benzothiadiazin-3-one 1,1 dioxide.

4. 2 - [4 - (4 - m - chlorophenyl - 1 - piperazyl)butyl]-1,2,4(2H, 4H)-benzothiadiazin-3-one 1,1-dioxide.

5. 2 - [3 - (4 - m - trifluoromethylphenyl - 1 - piperazyl)propyl]-1,2,4(2H, 4H)-benzothiadiazin-3-one 1,1-dioxide.

6. 2 - [3 - (4 - phenyl - 1 - piperidyl)propyl] - 1,2,4(2H, 4H)-benzothiadiazin-3-one 1,1-dioxide.

7. 2 - [5 - (4 - phenyl - 1 - piperazyl)pentyl] - 1,2,4(2H, 4H)-benzothiadiazin-3-one, 1,1-dioxide.

8. 2 - [3 - (4 - p - fluorophenyl - 1 - piperazyl)propyl]-1,2,4(2H, 4H)-benzothiadiazin-3-one, 1,1-dioxide.

9. A process for the preparation of a compound of the formula

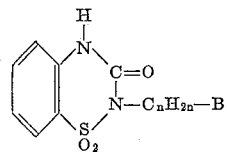

wherein $n$ is an integer from 3 to 5 and B is a member selected from the group consisting of

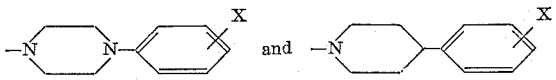

wherein X is a member selected from the group consisting of hydrogen, fluoro, chloro and trifluoromethyl, which comprises reacting o-nitrobenzenesulfonyl chloride with a compound of the formula

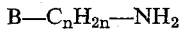

in the presence of a base,
reducing the resulting o-nitrobenzenesulfonamide to a compound of the formula

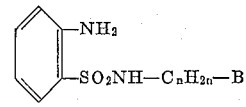

and
reacting the resulting o-nitrobenzenesulfonamide with a carbonyl cyclizing agent to produce the desired compound.

No references cited.

NICHOLAS S. RIZZO, *Primary Examiner.*